US008824240B2

(12) United States Patent
Roberts et al.

(10) Patent No.: US 8,824,240 B2
(45) Date of Patent: Sep. 2, 2014

(54) APPARATUS AND METHOD FOR MEASURING THE ACOUSTIC IMPEDANCE OF WELLBORE FLUIDS

(75) Inventors: Edwin K. Roberts, Benbrook, TX (US); Lucio Nelson Tello, Benbrook, TX (US)

(73) Assignee: Weatherford/Lamb, Inc., Houston, TX (US)

(*) Notice: Subject to any disclaimer, the term of this patent is extended or adjusted under 35 U.S.C. 154(b) by 356 days.

(21) Appl. No.: 13/226,808

(22) Filed: Sep. 7, 2011

(65) Prior Publication Data

US 2013/0058193 A1 Mar. 7, 2013

(51) Int. Cl.
  *G01V 1/52* (2006.01)
  *E21B 47/00* (2012.01)
  *G01V 1/44* (2006.01)
  *E21B 47/10* (2012.01)

(52) U.S. Cl.
  CPC .............. *G01V 1/44* (2013.01); *E21B 47/101* (2013.01)
  USPC ............................................ 367/35; 181/105

(58) Field of Classification Search
  USPC ............................................ 367/35; 181/105
  See application file for complete search history.

(56) References Cited

U.S. PATENT DOCUMENTS

| | | | |
|---|---|---|---|
| 4,255,798 A | 3/1981 | Havira | |
| 4,571,693 A | 2/1986 | Birchak et al. | |
| 4,671,379 A * | 6/1987 | Kennedy et al. | 181/106 |
| 4,685,092 A | 8/1987 | Dumont | |
| 5,146,432 A | 9/1992 | Kimball et al. | |
| 5,204,529 A | 4/1993 | Diatschenko | |
| 5,216,638 A * | 6/1993 | Wright | 367/35 |
| 5,341,345 A | 8/1994 | Warner et al. | |
| 6,041,861 A | 3/2000 | Mandal et al. | |
| 6,050,141 A | 4/2000 | Tell et al. | |
| 6,538,958 B1 | 3/2003 | Blankinship et al. | |
| 6,712,138 B2 | 3/2004 | Mandal | |
| 6,957,700 B2 | 10/2005 | Mandal | |
| 7,418,865 B2 | 9/2008 | Griffiths et al. | |
| 7,596,452 B2 | 9/2009 | Madigan et al. | |
| 7,634,946 B2 | 12/2009 | Irani et al. | |
| 7,921,691 B2 | 4/2011 | DiFoggio et al. | |
| 2006/0067162 A1 | 3/2006 | Blankinship et al. | |
| 2006/0262643 A1 * | 11/2006 | Blankinship et al. | 367/25 |
| 2009/0213689 A1 * | 8/2009 | Tello | 367/35 |

OTHER PUBLICATIONS

European Search Report for Application No. EP 12183600, dated Dec. 12, 2012, 5 pages.
Weatherford (R) Wireline Services "Ultrasonic Radial Scanner (URS)," Data Sheet (C) 2006-2011 Weatherford., 2 pages.

* cited by examiner

*Primary Examiner* — Ian J Lobo
(74) *Attorney, Agent, or Firm* — Wong, Cabello, Lutsch, Rutherford & Brucculeri LLP

(57) ABSTRACT

An ultrasonic scanner tool employs a transducer that excites a target plate at a known distance from the transducer. One side of the target plate forms a chamber that in operation is filled with wellbore fluid. On the other side of the target plate, a chamber is formed containing a vacuum or a fluid with a significantly lower acoustic impedance than the wellbore fluid and the target plate, allowing an improved measurement of the acoustic impedance of the wellbore fluid.

24 Claims, 12 Drawing Sheets

SECTION C-C

SECTION B-B

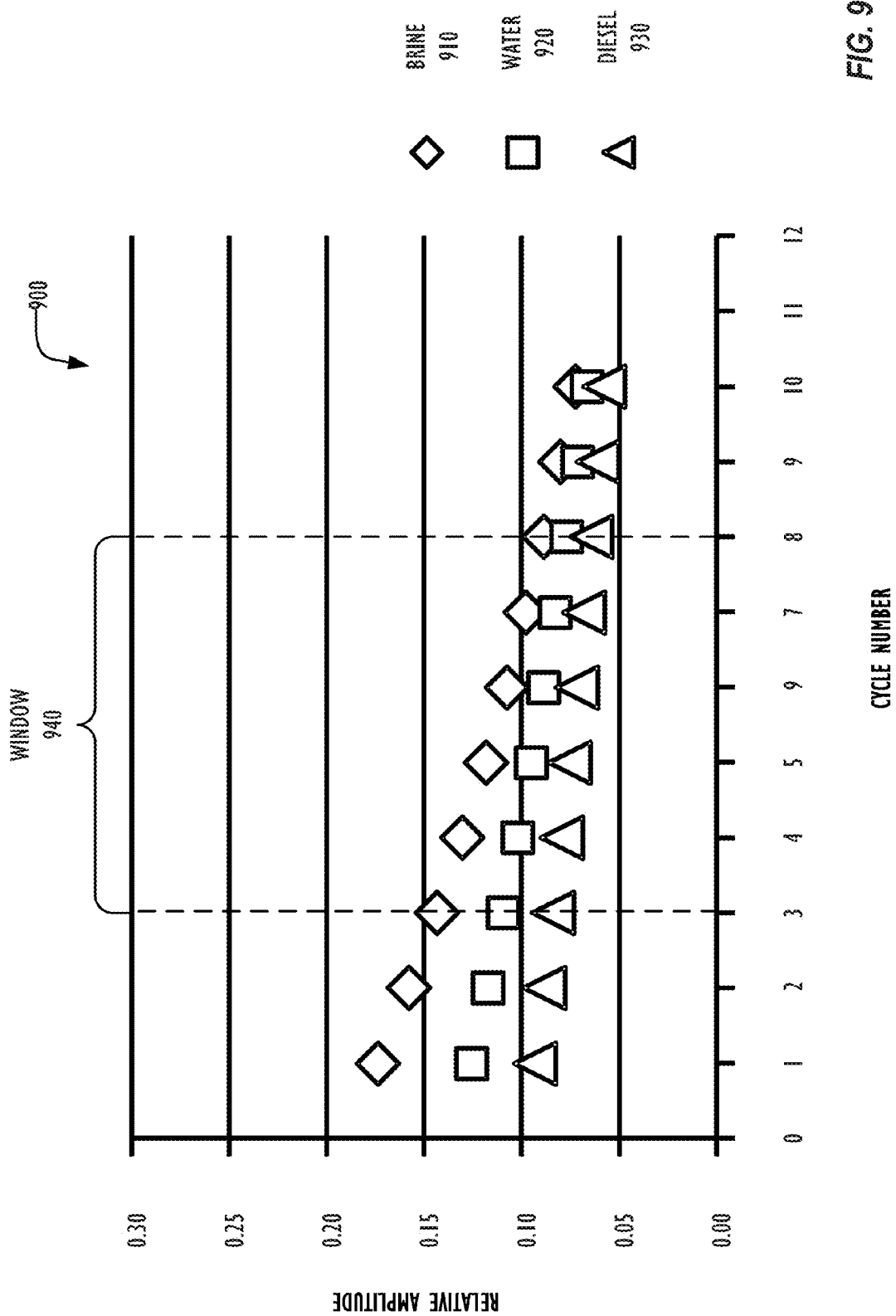

APPARATUS AND METHOD FOR MEASURING THE ACOUSTIC IMPEDANCE OF WELLBORE FLUIDS

TECHNICAL FIELD

The present invention relates to the field of downhole tools, and in particular to a downhole tool for measuring the acoustic impedance of wellbore fluids.

BACKGROUND ART

In various industrial processes that involve fluid material, knowing the properties of the fluids involved is useful. These fluid properties include, for example, speed of sound, density, compressibility, reflectance, acoustic impedance, viscosity, and attenuation. Knowledge of the values of these various properties can be used to adjust process parameters or warn of impending calamity. In many applications, such as oil and gas well (borehole) drilling, fluid density is of particular interest. It is important to know the density of drilling fluid (also referred to as drilling mud) during a drilling operation, in order to prevent a blowout of the well.

In a drilling operation, drilling fluid is pumped down the drill string (essentially a very long pipe), exits at the drill bit, and then returns to the surface within an annulus formed between the outside of the pipe and the inside of the borehole. As the bit drills into the geologic formations, it passes through zones containing various fluids, including lightweight fluids such as saltwater, oil (hydrocarbons), and natural gas. If the pressure within the zone is greater than the pressure within the borehole, these fluids will enter the borehole and mix with the drilling fluid. When lightweight fluids mix with drilling fluid, its density decreases. If the total weight of fluid within the borehole decreases too much, it can lead to a blowout when a high-pressure zone is entered. Accurately monitoring the density of the drilling fluid is therefore very important. In producing wells the fluid density, with other measurements, is used to infer the proportions of oil, water, and natural gas that the well is producing at various depths in the well. Logging tools for measuring fluid density are well known.

An ultrasonic radial scanner tool measures the acoustic impedance of materials immediately behind the casing in a well bore, from which density and other properties may be inferred. Typically, an ultrasonic transducer mounted in a rotating head is used to make the measurement of acoustic impedance behind the casing wall. This measurement is typically made by using an ultrasonic pulse to excite the casing wall in the thickness mode of vibration and measuring the energy content of the returning ultrasonic wave's amplitude. The values for acoustic impedance are then used to identify the material behind the casing. The measurement is to some degree affected by the acoustic impedance of the fluid inside the casing. A more accurate result for the measurement of the acoustic impedance of the material behind the casing would be achieved if it were corrected for the influence of the acoustic impedance of the fluid inside the casing.

U.S. Pat. Nos. 4,685,092 and 6,041,861 describe methods to correlate acoustic impedance of the well bore fluid to the speed of sound in that fluid. U.S. Pat. No. 6,050,141 describes a method for measuring the acoustic impedance of the fluid in a wellbore, particularly of wet cement in wells being prepared for abandonment.

FIG. 1 is a diagram of a fluid transducer portion 100 of a prior art ultrasonic radial scanner tool from Weatherford International, Inc., the assignee of the present application. In this tool, a second transducer 110 is mounted in a fixed location in housing 150 and uses a plate 120 of known properties and distance from the transducer 110 as a reference target. The housing 150 is open to the wellbore fluid, allowing wellbore fluid to enter chambers 130 and 140, so that plate 120 has wellbore fluid on both sides. The transducer 110 and target plate 120 are used to measure the speed of sound of the wellbore fluid inside the well casing. The speed of sound is then used with the time of flight information from the transducer in the rotating head to determine the inside diameter of the casing.

There was a belief in the past that good measurements of wellbore fluid acoustic impedance could be obtained by measuring the decay of the returning ultrasonic waves from the plate 120 with wellbore fluid on both sides, using just the transducer 110 and the known plate 120. However, when this was attempted, inconsistent results were obtained. A better system for performing these measurements would be desirable.

SUMMARY OF INVENTION

Various embodiments disclosed below provide an ultrasonic scanner tool that employs a transducer mounted in a fixed location that excites a target plate at a known distance from the transducer. One side of the target plate forms a chamber that in operation is filled with wellbore fluid. On the other side of the target plate, a chamber is formed containing a vacuum or a fluid with a significantly lower acoustic impedance than the wellbore fluid and the target plate, allowing an improved measurement of the acoustic impedance of the wellbore fluid.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

FIG. 9 is a diagram of the relative amplitude of an ultrasonic wave in various fluids for the ultrasonic scanner tool of FIG. 3, as determined by theoretical calculations.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 2:
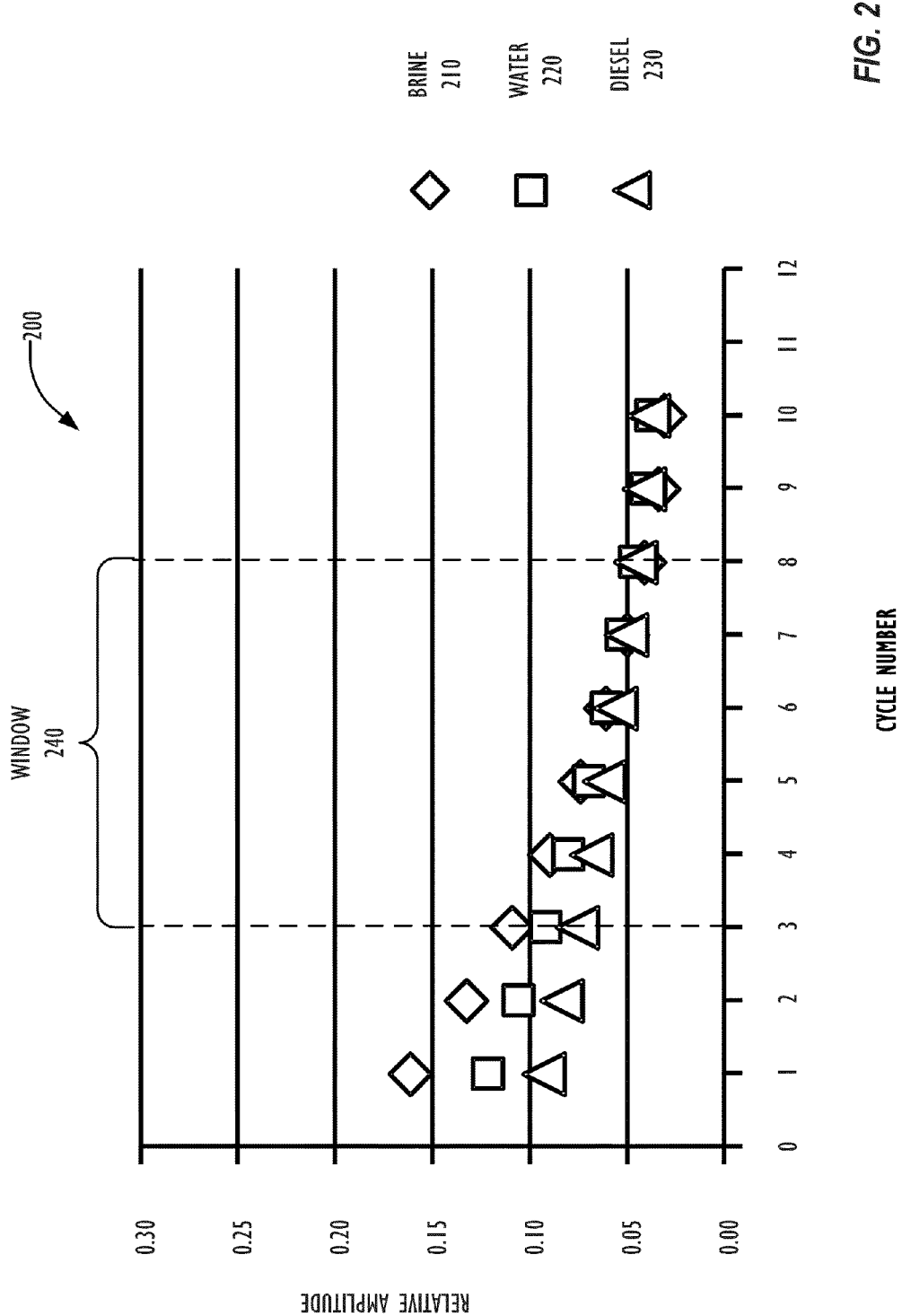
FIG. 2 is a diagram of the relative amplitude of an ultrasonic wave in various fluids for the prior art ultrasonic scanner tool of FIG. 1, as determined by theoretical calculations.

In part, as illustrated by the prior art graph of FIG. 2, previous acoustic impedance measurement technology produced inconsistent results because the relative amplitudes of signals returned from the target plate 120 in the presence of different types of wellbore fluid are so similar. In general, acoustic impedance measurement is best performed during a ring down window, illustrated as the window 240 in FIG. 2, while the speed of sound may be measured from the initial reflection prior to the window 240.

Figure 1:
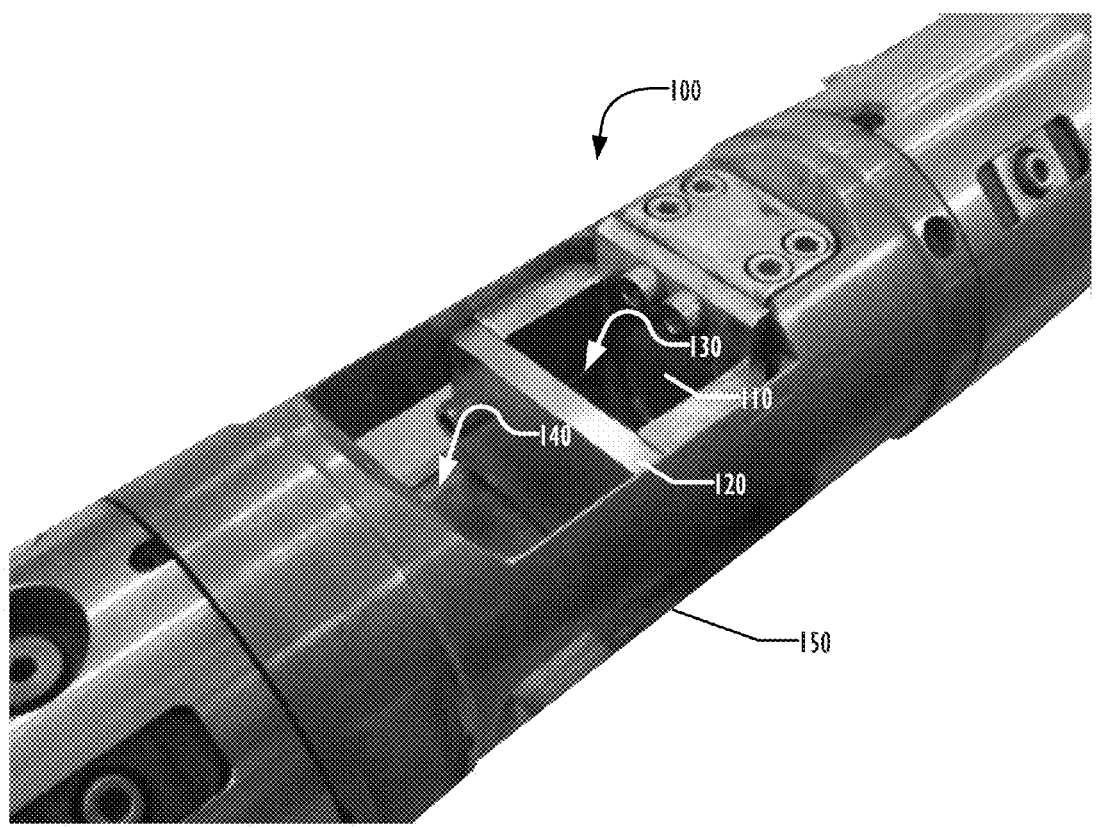
FIG. 1 is a diagram of a portion of an ultrasonic scanner tool according to the prior art.

When the ultrasonic transducer 110 transmits an acoustic pulse into the wellbore fluid filled chamber 130 illustrated in FIG. 1, the acoustic pulse propagates through the wellbore fluid to the face of the target plate 120. When the acoustic pulse strikes the plate 120, part of the energy is reflected and part of the acoustic energy is transmitted into the plate 120. The proportions of energy reflected and transmitted are determined by a function of the difference in acoustic impedance between the wellbore fluid and the plate 120. The closer the acoustic impedance of the fluid is to that of the plate 120, the more energy is transferred into the plate 120 and the less energy is reflected. As the acoustic impedance of most wellbore fluids is small compared to the metal of the plate 120, most of the energy is reflected. The reflected energy then propagates back to ultrasonic transducer 110 where it is received and measured. The time since the initial transmission is measured and used to calculate the speed of sound in the wellbore fluid. The energy that is transmitted into the plate 120 will excite the thickness mode of vibration for the plate 120. As the plate 120 vibrates, energy is transmitted from the plate 120 back into the fluid in chambers 130 and 140. As before, the rate of energy transmission is determined by a function of the difference in acoustic impedance between the metal of the plate 120 and the wellbore fluid, with a closer match in acoustic impedance allowing energy to be transmitted back into the wellbore fluid at a higher rate. Some of this acoustic energy will propagate through the wellbore fluid back to the ultrasonic transducer 110 where is received and can be measured. The received signal from the vibration of the plate 120 is integrated over many cycles of vibration in ring down window 240 to reduce the effects of variations in the wave form and noise. The integral over many cycles is proportional to the energy of the plate reverberations.

The value for the integrated received signal is normalized to the amplitude of the first received signal from the reflected pulse. This normalization removes the effects of attenuation in the wellbore fluid and variations in the ultrasonic transducer 110's signal strength.

Comparing the response of a relatively high acoustic impedance fluid to one with lower acoustic impedance, the initial reflection's received signal is somewhat smaller. Because of the closer match of the high acoustic impedance fluid to the impedance of the plate 120, more energy is transferred into the plate 120 leaving less to be reflected. The initial signal received from the vibration is also larger for the higher acoustic impedance wellbore fluid, because more energy is transferred into the plate 120 initially and energy is transferred back out more easily due to the closer match between the fluid and the plate 120. The decay rate of the returning signal is also greater for the higher acoustic impedance wellbore fluid because the energy is more quickly transferred out of the vibrating plate 120 leaving less energy remaining in the plate 120 at later times to generate signal. For the plate 120 as illustrated in prior art FIG. 1, which has wellbore fluid on both sides of the plate 120 in chambers 130 and 140, the rapid decay leaves only a small difference between the values of the integrated signal for higher and lower acoustic impedance wellbore fluid. This small difference leads to the inconsistency in the measurement.

Embodiments described below improve on the signaling, providing greater differentiation between wellbore fluids of different acoustic impedances. Instead of having chambers on both sides of the target plate filled with wellbore fluid, a chamber on the opposite side of the target plate is filled with a low acoustic impedance gas or a vacuum. As described in more detail below, this causes the decay curves of different wellbore fluids to be more separated, allowing better measurement of the acoustic impedance.

Figure 3:
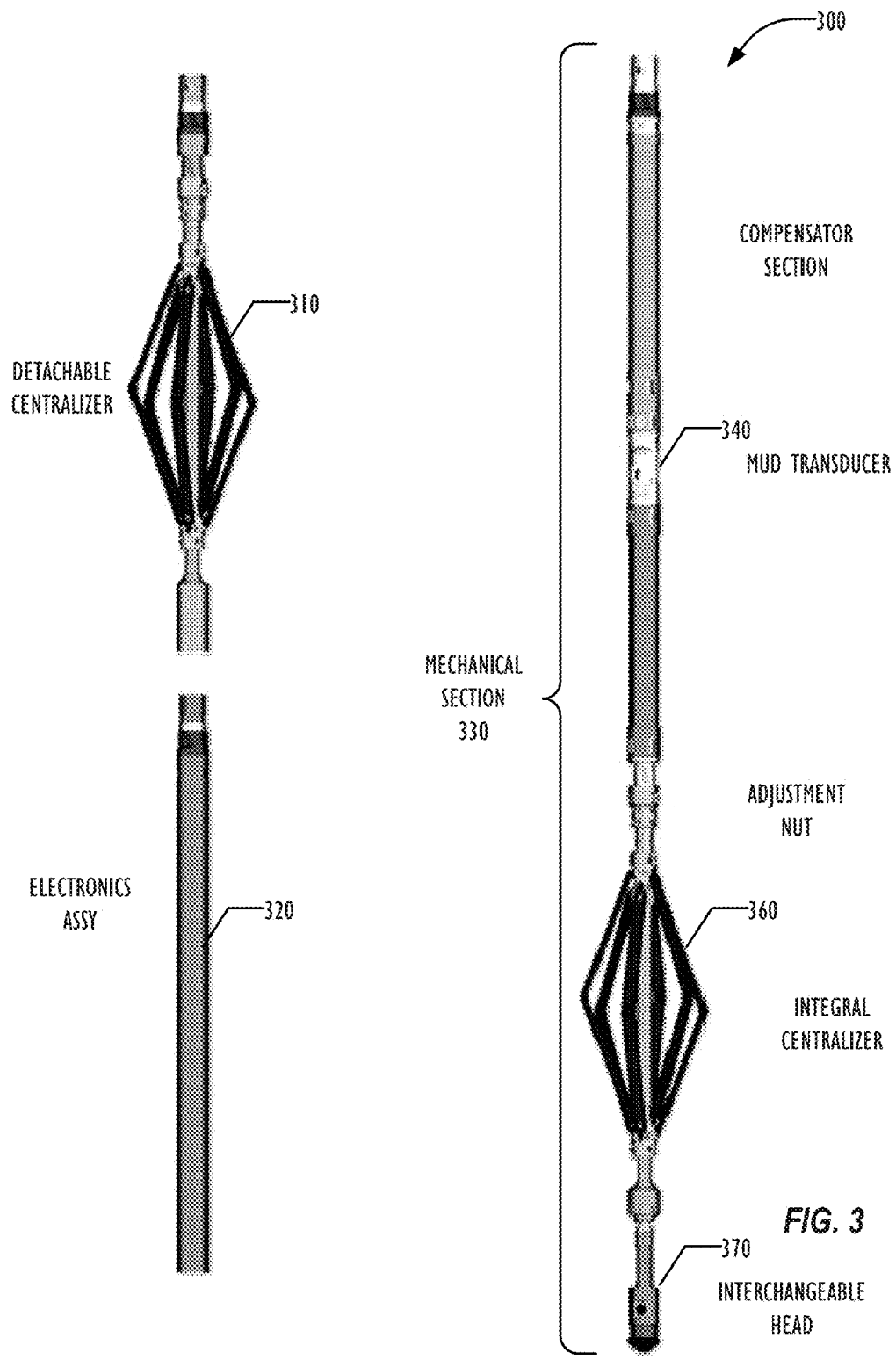
FIG. 3 is an ultrasonic radial scanner tool according to one embodiment.

FIG. 3 is a block diagram illustrating an ultrasonic radial scanning tool 300 according to one embodiment. As illustrated, the tool 300 comprises a detachable centralizer 310, electronics assembly 320, and a mechanical section 330. The detachable centralizer 310 keeps the tool 300 away from the wall of the casing in which the tool 300 is inserted. Because the centralizer 310 is detachable, different configurations and sizes of centralizer may be used as desired.

The electronics assembly 320 contains electronics for signal acquisition, conditioning, processing and communicating to a surface analysis system such as is described below with regard to FIG. 11. The tool 300 is typically configured to communicate via a wireline (not shown in FIG. 3) that is connected to the tool 300 and is also used for insertion and removal of the tool 300 into the wellbore. The mechanical section 330 comprises a number of elements. In the embodiment illustrated in FIG. 3, the tool 300 is a radial scanning tool, using a ultrasonic transducer in rotating head element 370 for generating ultrasonic pulses as the rotating head element 370 rotates. Measurements obtained from the ultrasonic transducer in rotating head element 370 are then sent uphole by the electronics assembly 320 for analysis.

A second centralizer 360 keeps the rotating head element 370 centralized in the casing. As indicated in FIG. 3, the centralizer 360 may be integral with the mechanical section 330. Alternately, the centralizer 360, like the centralizer 310, may be detachable and replaceable as desired. Either of the two centralizers 310 and 360 may be adjustable to adjust how far out the centralizer arms extend to make entry in to small well bores easier and to close the centralizers 310 and 360 for transport.

A fixed mud transducer section 340 provides the capability for measuring the acoustic impedance of the wellbore fluid as is described in more detail below. The relative positions of the various elements of the tool 300 are illustrative and by way of example only and other relative positions may be used. Other elements may be included in the tool 300 as desired.

Figure 4:
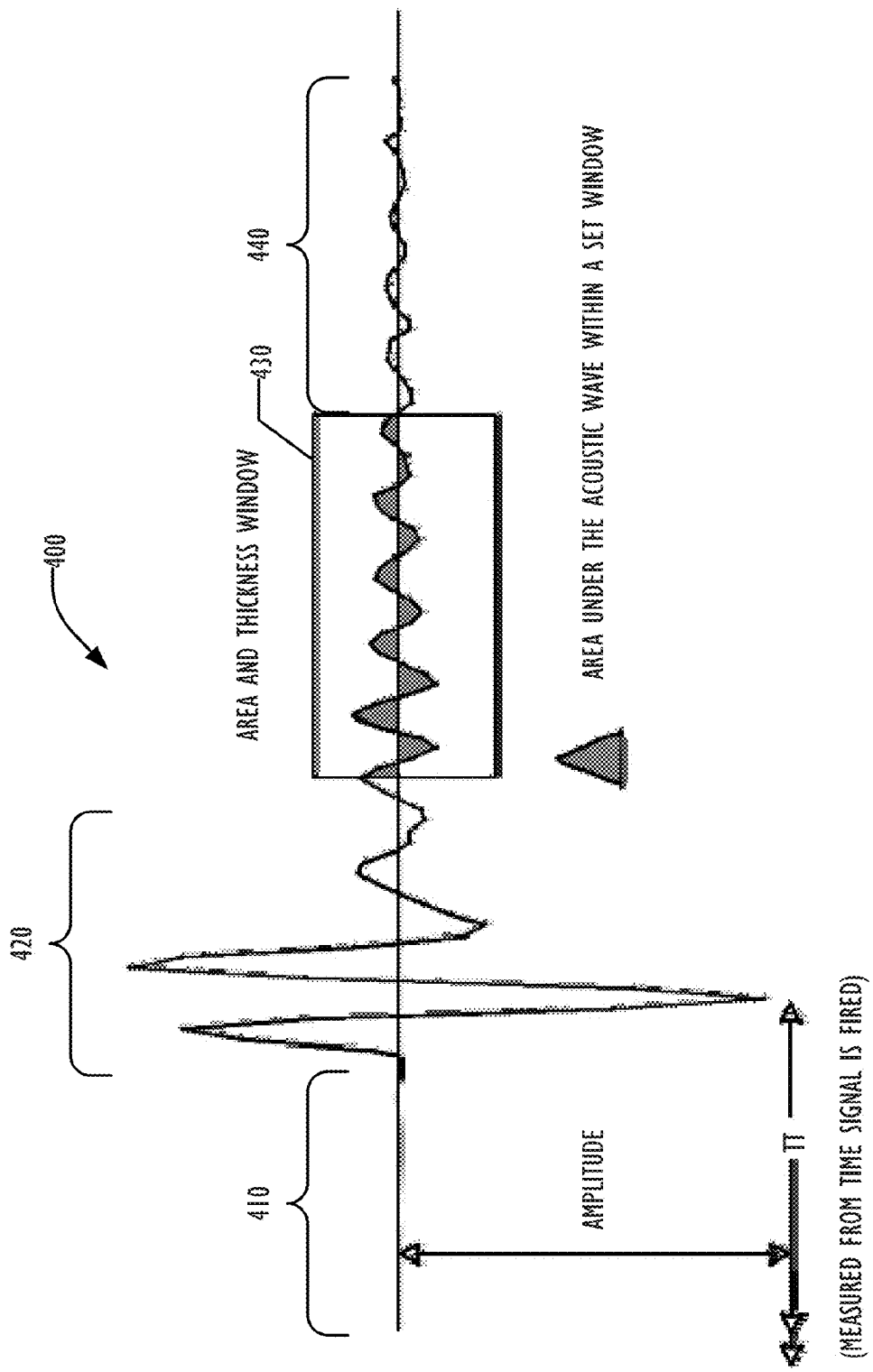
FIG. 4 is a graph illustrating a window for measuring energy of an ultrasonic wave according to one embodiment.

FIG. 4 is a graph illustrating a response curve received by a receiver of an acoustic signal generated by the fixed mud transducer section 340, illustrating portions of the curve of interest to the present disclosure. The left end of the graph 400 can be considered the time at which the initial pulse is generated by the transducer, moving to the right over time.

An initial portion 410 of the graph 400 is a time between the initial pulse generated by the transducer and any signal reflected back from the target plate is received. An initial reflection portion 420 corresponds to an initial reflection of energy back from the target plate to the receiver. The time between the pulse and the receipt of the initial reflection signal may be used to calculate the speed of sound in the wellbore fluid. A third portion of the graph 400 is a ring down window 430 corresponding to the amplitude decay of acoustic signals retransmitted back by the thickness vibration of the target plate. In one embodiment, the area under the acoustic wave within the ring down window 430 is used for the measurement of the acoustic impedance of the wellbore fluid. A final section 440 corresponds to a final decay of the acoustic signal retransmitted back to the receiver and is typically not used for measurement purposes.

Figure 5:
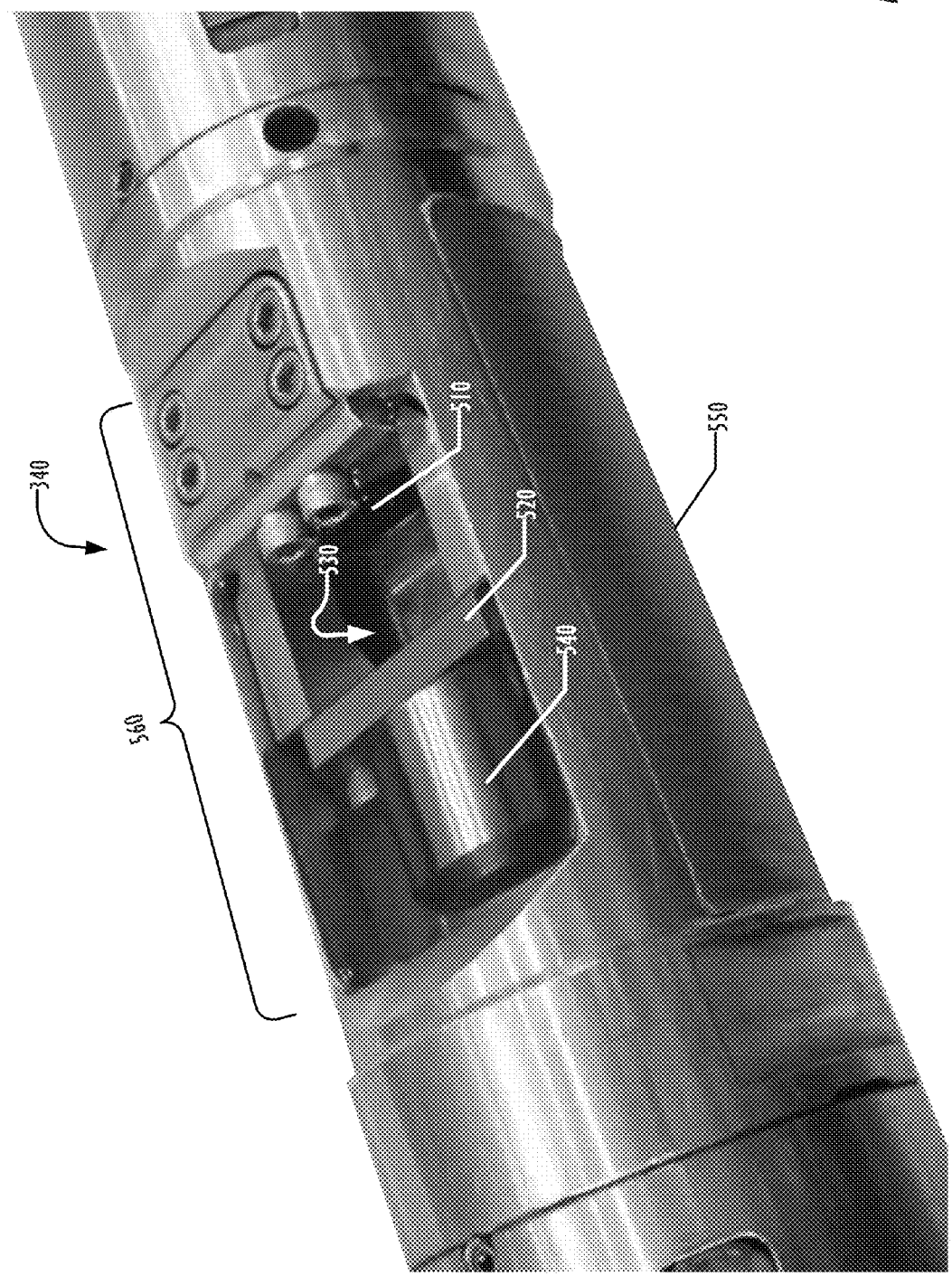
FIG. 5 is a diagram illustrating a transducer portion of the ultrasonic radial scanner tool of FIG. 3 according to one embodiment.

FIG. 5 is a block diagram of a fixed transducer section 340 of the ultrasonic scanner tool 300 according to one embodiment. The transducer section 340 is similar to the prior art transducer section 100 of FIG. 1, except that instead of a chamber 140 that is open to and filled with wellbore fluid during operation of the transducer section 340, the transducer section 340 includes an enclosure 540. As illustrated in FIG. 5, one side of the mandrel 550 is closed, but various embodiments may be constructed in which both sides of the mandrel 550 are open to the wellbore fluid.

The elements of the fixed transducer section 340 are fitted into a mandrel 550. Mandrel 550 may be formed of any durable, corrosion-resistant material, such as stainless steel, titanium, nickel alloys, etc. An opening 560 is machined or otherwise formed into the mandrel 550, allowing placement of the various elements of the fixed transducer section 340 into the mandrel 550, as well as providing fluid communication between the wellbore and the elements of the fixed transducer section 340 so that they are bathed in wellbore fluid when in operation.

A transducer 510 is positioned in the mandrel 550 at a predetermined fixed distance from a target plate 520, forming an open chamber 530 that is filled with wellbore fluid when in operation. Acoustic signals generated by the transducer 510 are propagated through the wellbore fluid to the target plate 520.

In contrast to the prior art transducer section 100 of FIG. 1, at least a portion of the side of the target plate 520 distal to the transducer 510 is covered with an enclosure 540, forming a chamber on the opposite side of the target plate 520 from the transducer 510. As illustrated in FIG. 5, the enclosure 540 is a substantially cylindrical enclosure, but other enclosure shapes may be used as desired.

The enclosure 540 is sealed to the target plate 520, preventing the wellbore fluid from entering the chamber formed by the enclosure 540. In one embodiment, the enclosure 540 is filled with a gas or other fluid of significantly lower acoustic impedance than the wellbore fluid. In another embodiment, the enclosure 540 contains at least a partial vacuum. In one embodiment, the enclosure 540 is electron beam welded to the plate 520, which pulls a vacuum in the enclosure as part of the electron beam welding process.

When the enclosure 540 containing gas or a vacuum is added to the side of the plate 520 away from the transducer 510, the decay rate of the acoustic signal is substantially reduced. Gases generally have acoustic impedances that are small compared to wellbore fluids, and are much smaller than the metal of the plate. The acoustic impedance of a vacuum would be even smaller than a gas, the degree depending on the quality of the vacuum. With the very low acoustic impedance of a gas or vacuum on the far side of the plate 520, very little energy is transmitted from the plate 520 into the enclosure 540, reducing the decay rate of the signal returning to the transducer 510. With the decay rate reduced, significant differences in the system response between higher acoustic impedance wellbore fluids and lower acoustic impedance fluids can be seen.

The enclosure 540 containing gas or a vacuum is designed to withstand the wellbore environment, namely high temperature and very high external pressure. In one embodiment, the enclosure is designed to withstand temperatures of 177° C. (350° F.) and pressures up to 138 MPa (20,000 psi). In other embodiments, the enclosure 540 may be designed to withstand higher or lower temperatures and/or pressure as desired.

Figure 6A:
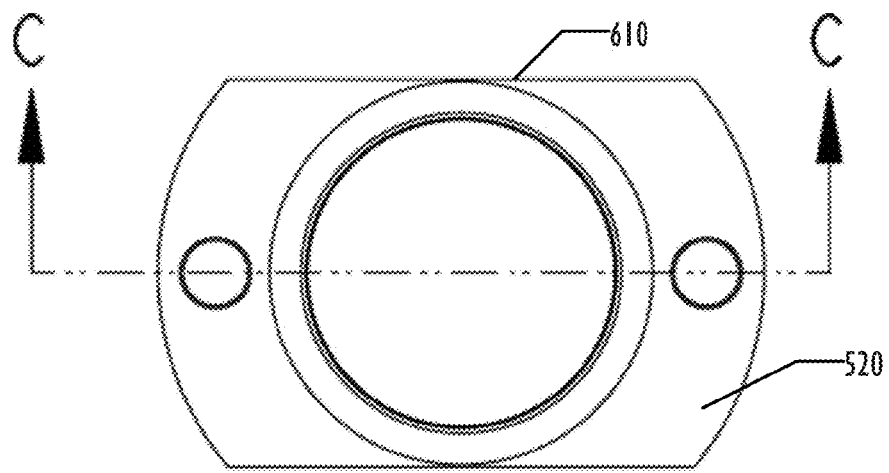
FIGS. 6A-6C are three views of an integral plate and enclosure walls unit according to one embodiment.
Figure 6B:
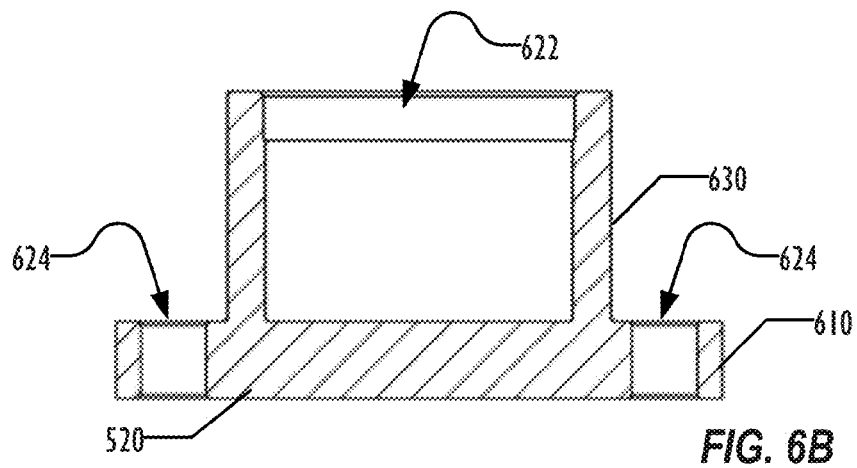
Figure 6C:
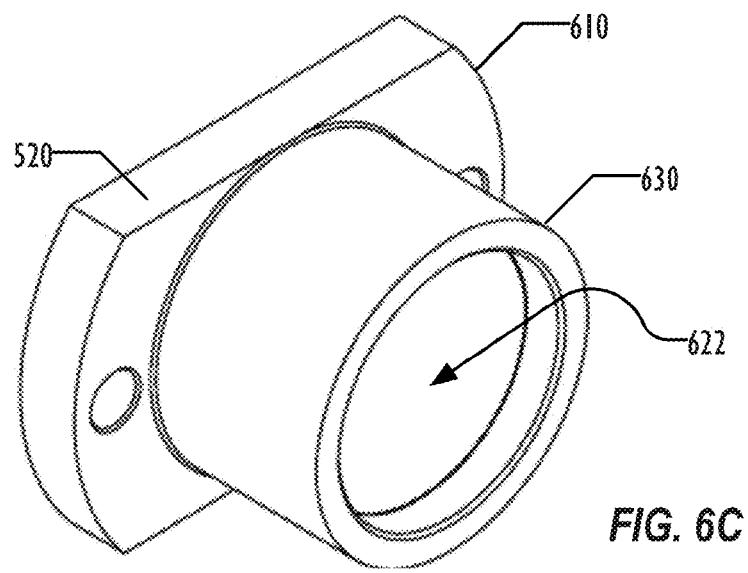

FIGS. 6A-6C are three views illustrating a plate and enclosure according to one embodiment in which the plate 520 and walls of the enclosure 540 are formed from a single block of metal. In FIG. 6A, an integral plate and cylindrical enclosure walls unit 610 is machined or otherwise formed as an integral unit. FIG. 6B is a cross-sectional view along line C-C of FIG. 6A. In this embodiment, two holes 624 are formed for attaching the unit 610 to the mandrel 550. A cylindrical chamber 622 is formed by the walls 630 of the enclosure of unit 610. FIG. 6C is an isometric view of the unit 610 of FIGS. 6A and 6B, illustrating the chamber 622 bounded by the walls 630 of unit 610.

Figure 7A:
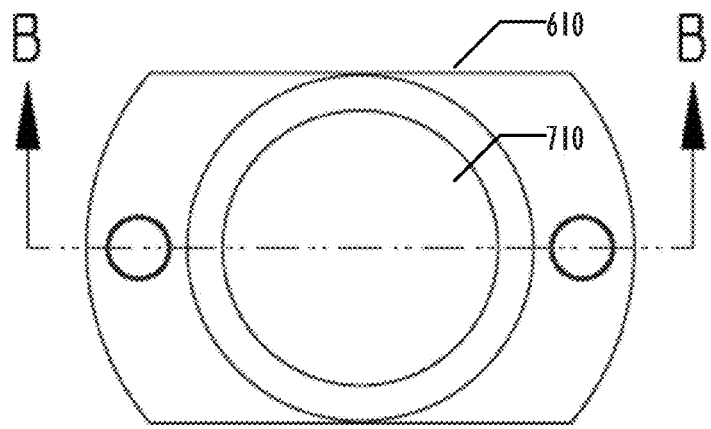
FIGS. 7A-7C are three views illustrating the unit of FIGS. 6A-6C together with a cap unit according to one embodiment.
Figure 7B:
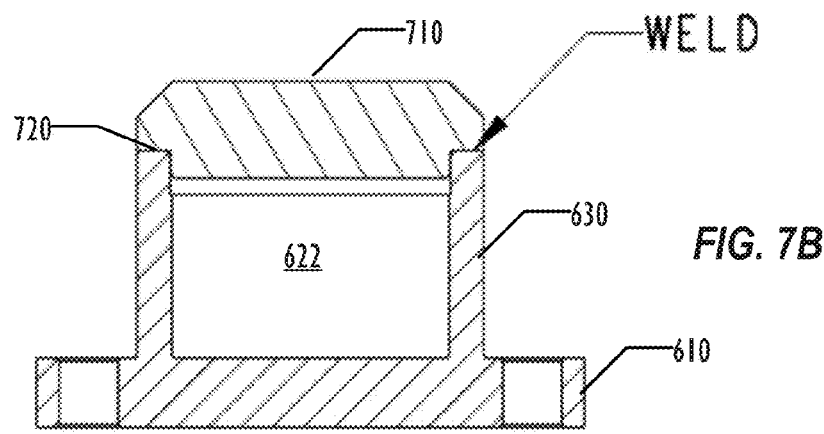
Figure 7C:
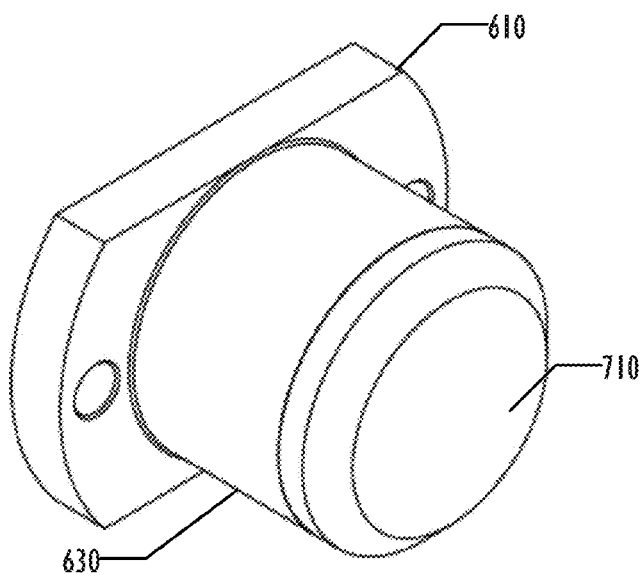

FIGS. 7A-7C are three views illustrating the unit 610 according to FIGS. 6A-6C with the cavity 622 covered by a cap piece 710, machined or otherwise formed to fit with the enclosure walls 630 of the unit 610. The cap 710 is described in further detail below in the description of FIGS. 8A-8C. FIG. 7A is a top view illustrating the combined unit. FIG. 7B is a cross-sectional view illustrating the combined unit along line B-B of FIG. 7A. FIG. 7C is an isometric view showing the placement of the cap 710 on the unit 610. As best illustrated in FIG. 7B, in one embodiment a shoulder 720 may be formed in the cap 710, with a portion of the cap 710 extending into the cylindrical enclosure formed by the walls 630, with the shoulder area 720 welded to the walls 630 to seal the chamber 622. The chamber 622 may be filled with a gas. Alternately, at least a partial vacuum may be formed in the chamber 622. In one embodiment, the vacuum is produced as a result of the welding procedure. Any desired welding procedure may be used, including electron beam welding.

The length of the chamber 622 is preferably long enough to insure the plate and back of the chamber 622 formed by the cap 710 would never touch. Thus the length of the walls may range from several thousandths of an inch to several inches in length as desired.

Figure 8A:
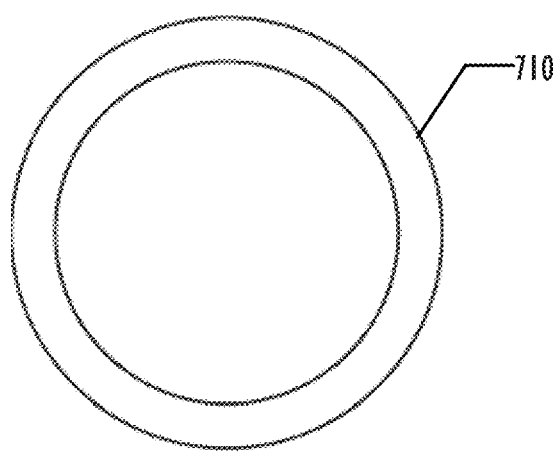
FIGS. 8A-8C are three views illustrating a cap for the enclosure of FIGS. 6A-7C according to one embodiment.
Figure 8B:
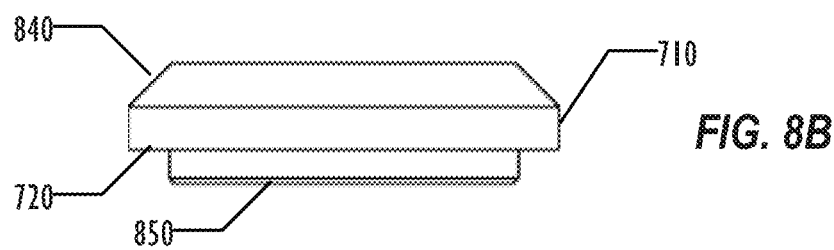
Figure 8C:
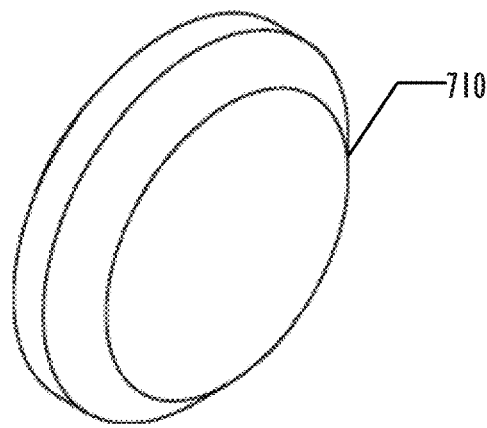

FIGS. 8A-8C are three views illustrating the cap 710 according to one embodiment. FIG. 8A is a top view, FIG. 8B is a side view, and FIG. 8C is an isometric view illustrating the cap 710 of FIGS. 7A-7C. As best illustrated in the side view of FIG. 8B, in one embodiment an upper portion 840 of the cap 710 is chamfered or otherwise tapered. Alternate shapes of the upper portion of the cap 710 may be used as desired. The lower portion 850 of the cap 710 extends from the upper portion 840, and has a diameter sized to fit within the cylindrical walls 630 of the unit 610, seating the shoulder area 720 or the cap 710 on the walls 630, where the cap 710 may be welded or otherwise attached to the unit 610 to seal the chamber 622.

Constructing the plate and chamber from an integral body and a cap as illustrated in FIGS. 6A-8C may be advantageous because any discontinuities (e.g., voids, inclusions, and changes in density) in the weld at the shoulder 720 would be far enough away that any acoustic energy reflected off them would arrive after the ring down window so they would not interfere with the measurement. In addition, such a construction would be easier to weld. Electron beam welding is a line of sight operation and it is easier to make the weld at the back than to try and skim the beam along the back of the flanges on either side of the part.

The diameter of the chamber 622 formed by the walls 630, the plate portion 520 of the unit 610, and the cap 710 is preferably larger than the spot size of the acoustic field of the transducer 510 at the distance between the transducer 510 and the plate 520, to avoid distortions caused by signal coming back from the side walls 630. The spot size boundary is where the intensity of the acoustic wave is one half the intensity at its maximum point. In one embodiment, the spot size for the transducer 510 is approximately 12.7 mm (½ inch) in diameter and the inside diameter of chamber 622 is approximately 32 mm (1¼ inches), thus only a negligible amount of the acoustic wave is affected by the side walls 630 of the chamber 622.

FIG. 9 is a graph illustrating theoretical calculations of relative amplitude curves for the same fluids graphed in FIG. 2. As can be easily seen in the ring down window 940 of FIG. 9, the relative amplitude curves are further apart than with the prior art apparatus of FIG. 1, resulting in improved ability to distinguish between the various fluids.

The embodiment of FIG. 5 may be considered as a way to measure how much energy is initially transferred into the plate 520 when the plate 520 is hit with the ultrasonic pulse from the transducer 510, instead of measuring the decay of the signal as an indicator of acoustic impedance.

The disclosed technique avoids the need to know or assume other factors that are typically used when acoustic impedance is inferred from the speed of sound. Acoustic impedance is defined as the product of the speed of sound and the density of a material. Correlation equations have been developed for determining acoustic impedance from the speed of sound, but there are different equations for different classes of wellbore fluids, wherein the classes comprise fluids made from fresh water, salt water, or oil. So the class of wellbore fluid must already be known or determined by other means to use that technique. There are wellbores with more than one class of fluid. In such wellbores, the location of the interface between the classes must be determined before the selecting the correlation equation.

In a device where a known fluid is placed between the transducer and the target plate, with an unknown wellbore fluid on the far side of the target plate, as the difference between the acoustic impedance of the known fluid and the plate remains approximately the constant, the same the amount of energy is transferred into the plate from the ultrasonic pulse. Therefore the acoustic impedance can be determined by measuring the energy of the returning signal as it decays. The techniques disclosed herein allow the use of an ultrasonic scanner tool with an unknown wellbore fluid between ultrasonic transducer and the target plate, where the speed of sound of the wellbore fluid can be measured and then used to determine the wellbore inside diameter when used with the data obtained from the transducer in the rotating head element 370.

In operation, the acoustic impedance of the wellbore fluid can be determined using the following equation:

$$Z_{mud} = Z_{calibration} + K^*(\text{Energy}_{mud} - \text{Energy}_{Calibration})$$

Where $Z_{mud}$ is the acoustic impedance of the wellbore fluid, K is a constant determined as described below, $\text{Energy}_{mud}$ is the energy measured as described above when the chamber 530 is filled with the wellbore fluid, $Z_{calibration}$ is the acoustic impedance of a fluid with known acoustic impedance, such as water and $\text{Energy}_{Calibration}$ is the energy measured when the chamber 530 is filled with the same fluid of known acoustic impedance. The acoustic impedance of water is known to be 1.5 MRayls.

Figure 10:
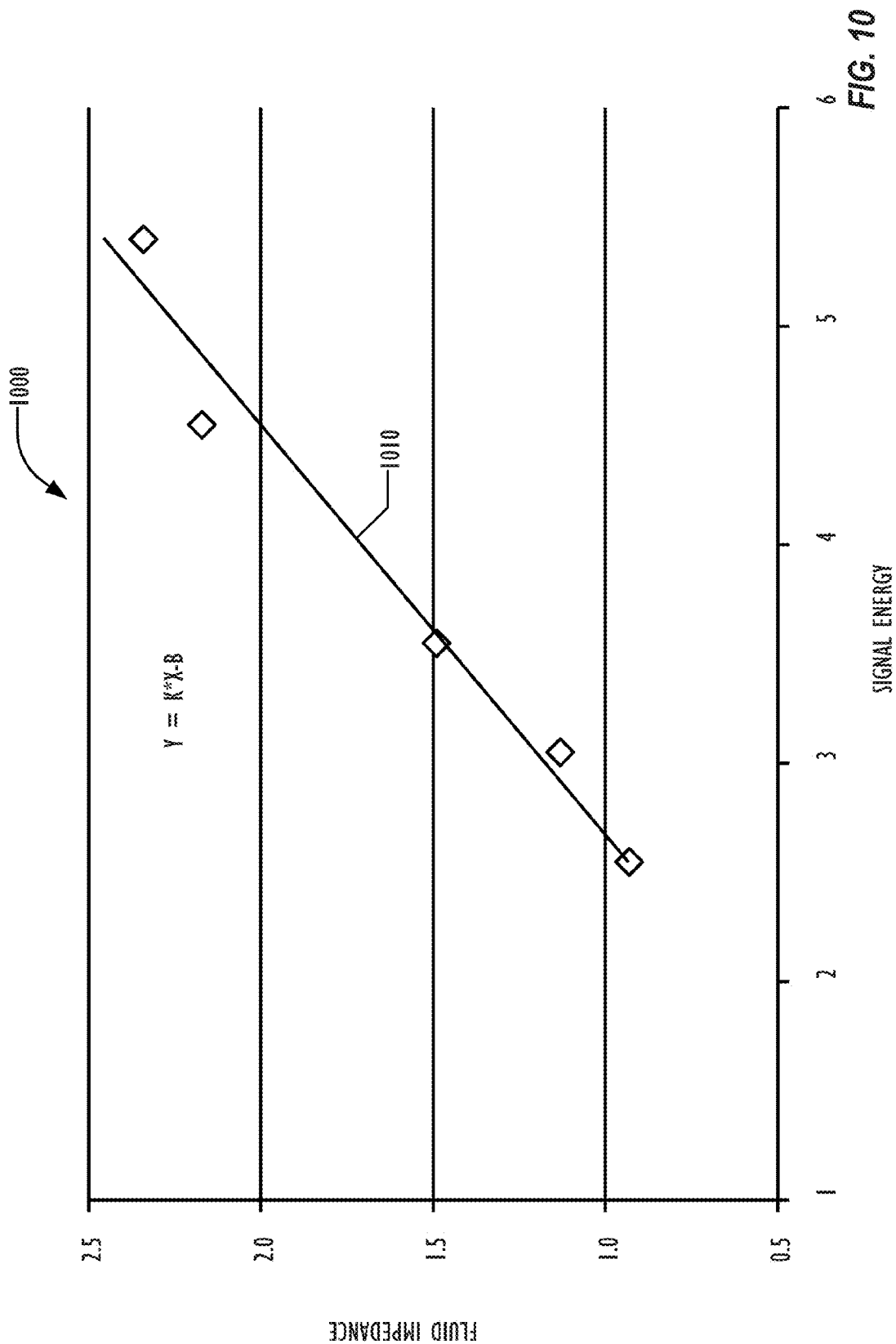
FIG. 10 is a graph illustrating a relationship between signal energy and fluid impedance according to one embodiment.

After first determining the $\text{Energy}_{Calibration}$ using water or other fluid of known acoustic impedance, the chamber 530 may be filled with other fluids of known acoustic impedance, such as diesel, brine, oil-based mud, and water-based mud, typical fluids used in oil exploration. The measurement results may be plotted on a graph such as the illustrative graph of FIG. 10, determining the constant K by fitting the line 1010 and determining the slope of the line 1010 as the constant K. Other curve fitting methods may also be used to fit the data such as higher order polynomials.

Figure 11:
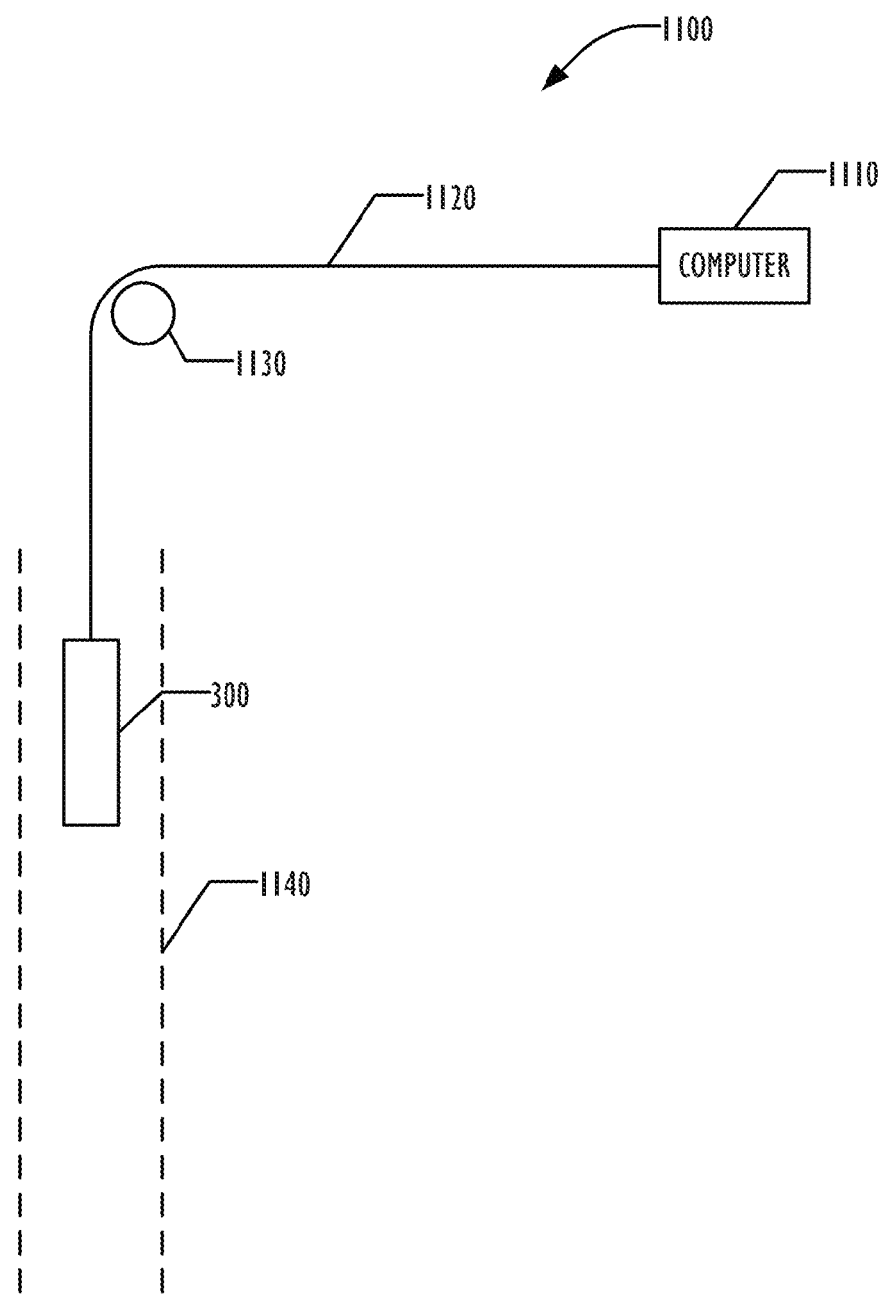
FIG. 11 is a schematic diagram of an acoustic measurement system using the ultrasonic radial scanner tool of FIG. 3, according to one embodiment.

FIG. 11 illustrates one embodiment of an acoustic logging system 1100 that utilizes tool 300 for borehole logging. The system 1100 comprises a surface computer 1110 connected to tool 300 and a wireline 1120 that lowers tool 300 into the well bore 1140, as well as appropriate mechanical support as generally indicated at 1130. Surface computer 1110 may be any type of data processing equipment capable of receiving signals from the tool 300 over the wireline 1120 and processing those signals, including general purpose computers and dedicated surface programmable analysis systems. Surface computer 1110 may be used for data acquisition, analysis, and storage, and merges acoustic impedance output data with raw measurements for storage and presentation. Surface computer 1110 may be positioned at the well site, or may be positioned remotely, with intervening communication equipment (not shown in FIG. 11) providing communications between the wireline 1120 and the surface computer 1110.

Figure 12:
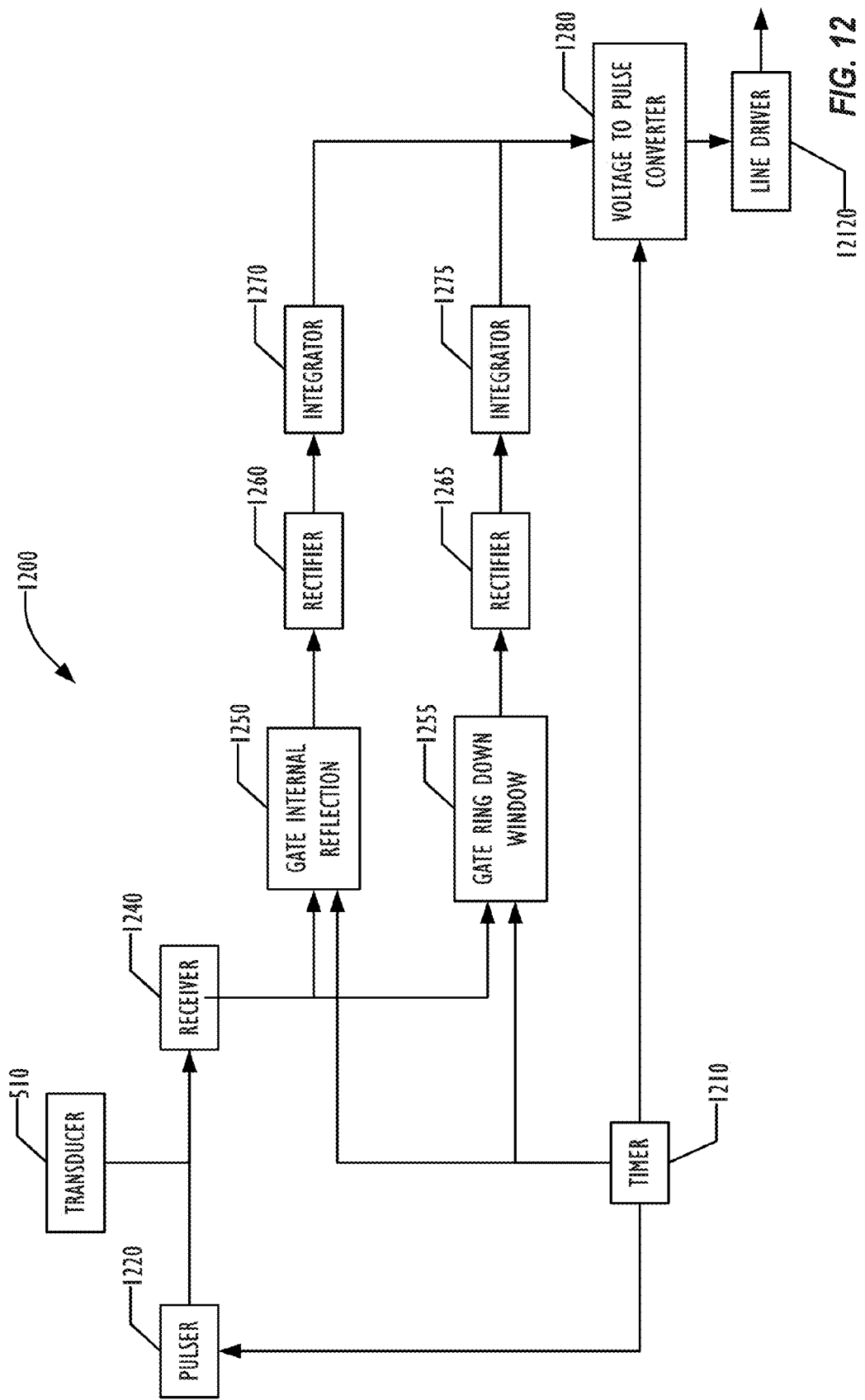
FIG. 12 is a block diagram illustrating a circuit used to compute the speed of sound in and the acoustic impedance of a fluid based on signals derived from the transducer used in the acoustic logging tool of FIG. 5, according to one embodiment.

Electronic signal processing for the measurement of speed of sound and acoustic impedance may be performed using the circuit 1200 illustrated in FIG. 12 according to one embodiment. A timer 1210 starts a measurement cycle by signaling a pulser 1220 to energize transducer 510. The acoustic pulse generated from transducer 510 travels out to plate 520. Some of the acoustic energy is reflected back to the transducer 510 and is amplified by receiver circuitry 1240. The received energy is processed in two time slots controlled by timer 1210. The first part of the received signal processed is the initial reflection window. This signal is gated through gate 1250 into a full wave rectifier 1260 and then into an integrator 1270, and can be used to determine the speed of sound in the wellbore fluid. After the time slot expires for the initial reflection, the gate 1250 is turned off and the voltage at the output of integrator 1270 is the measured value of interest. The ring down portion of the signal is similarly gated with similar processing until all measurements of interest are made on the returned energy. Specifically, the received signal is processed by the ring down window gate 1255 into another rectifier 1265 and then into another integrator 1275

The measured voltage levels are converted into a timed sequence of pulses by converter 1280. The position in the sequence indicates which measured value, and the voltage amplitude of the pulse is the measured value. This sequence of pulses then goes to a line driver 12120 which sends the information uphole through a wireline connection for further processing into acoustic impedance and speed of sound, and then further into fluid density. Thus, the apparatus described above can be used to generate both speed of sound and acoustic impedance measurements using a single chamber filled with wellbore fluid.

The circuit 1200 is illustrative and by way of example only, and other circuitry may be used for measuring the acoustic impedance of and speed of sound in the wellbore fluid as desired, including additional circuitry for measuring other information. In particular, digital circuitry may be used instead of the analog circuitry illustrated in FIG. 12.

Although the above description has been written in terms of an ultrasonic scanning tool, the structure of FIG. 5 may be used in other applications. For example, the structure of FIG. 5 may be used for measurement of fluid density in production logging applications.

Production logging is used after a well has been completed to determine the flow rate and type of fluid (water, salt water, oil, or natural gas) being produced from various zones of the well. One of the measurements taken in production logging is the fluid density. Typical practice for measuring fluid density in production logging is by using a radioactive chemical source (usually Cesium 137) and a radiation detector. A chamber open to the well fluid is positioned between the source and the detector. The greater the density of the fluid, the more the radiation is blocked from reaching the detector.

It is becoming more difficult to move radioactive sources across borders. Chemical radioactive sources are also becoming more expensive to purchase and more expensive to dispose of after reaching the end of their useful life. The apparatus described above can be used to measure fluid density of the production fluid. As described above, the apparatus may be used to measure the acoustic impedance and speed of sound of the well fluid. The acoustic impedance of a material is defined as the product of the speed of sound in that material and the density of the material. Therefore, the density of the fluid being produced by the well can be determined by dividing the measured acoustic impedance by the measured speed of sound obtained from the disclosed apparatus.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A measurement section for a downhole tool, comprising:
   a target plate;
   a transducer, disposed on a first side of the target plate, aimed at the target plate; and
   an enclosure, formed on a second side of the target plate, opposite the first side,
   wherein the first side of the plate is open to wellbore fluid when in operation, and
   wherein the enclosure encloses a volume of a lower acoustic impedance than the wellbore fluid.

2. The measurement section of claim 1, wherein the enclosure contains a gas of lower acoustic impedance than the wellbore fluid.

3. The measurement section of claim 1, wherein the enclosure encloses a vacuum.

4. The measurement section of claim 1, further comprising:
   a mandrel, open for entry of wellbore fluid when in operation,
   wherein the target plate, the transducer, and the enclosure are disposed within the mandrel.

5. The measurement section of claim 1, wherein the enclosure is electron beam welded to the target plate.

6. The measurement section of claim 1, wherein the enclosure and target plate comprise:
   an integral unit forming the target plate and walls of the enclosure; and
   a cap, sealed to the walls of the enclosure.

7. The measurement section of claim 1, wherein the enclosure is sealed with the target plate.

8. The measurement section of claim 1, wherein the enclosure causes a reduction in a decay rate of a signal returning to the transducer from the target plate.

9. A downhole tool, comprising:
   a first centralizer;
   an electronics assembly section, disposed with the first centralizer; and
   a mechanical section, comprising:
      a measurement section, comprising:
         a target plate;
         a transducer, disposed on a first side of the target plate, aimed at the target plate; and
         an enclosure, formed on a second side of the target plate, opposite the first side,
         wherein the first side of the plate is open to wellbore fluid when in operation, and
         wherein the enclosure encloses a volume of a lower acoustic impedance than the wellbore fluid.

10. The downhole tool of claim 9, the mechanical section further comprising:
    a rotating ultrasonic transducer section, disposed with the measurement section.

11. The downhole tool of claim 9, wherein the enclosure contains a gas of lower acoustic impedance than the wellbore fluid.

12. The downhole tool of claim 9, wherein the enclosure encloses a vacuum.

13. The downhole tool of claim 9, the measurement section further comprising:
    a mandrel, open for entry of wellbore fluid when in operation,
    wherein the target plate, the transducer, and the enclosure are disposed within the mandrel.

14. The downhole tool of claim 9, wherein the enclosure is electron beam welded to the target plate.

15. The downhole tool of claim 9, wherein the enclosure and target plate comprise:
    an integral unit forming the target plate and walls of the enclosure; and
    a cap, sealed to the walls of the enclosure.

16. The downhole tool of claim 9, wherein the enclosure is electron beam welded to the target plate.

17. The downhole tool of claim 9, wherein the enclosure is sealed with the target plate.

18. A method, comprising:
    filling a volume between a transducer and a target plate with a wellbore fluid;

enclosing a volume on a side of the target plate opposite the transducer, the volume having a lower acoustic impedance than the wellbore fluid;
sending ultrasonic pulses from the transducer in a downhole tool towards the target plate;
measuring a speed of sound in the wellbore fluid; and
measuring an acoustic impedance of the wellbore fluid, comprising:
    measuring an energy absorbed and retransmitted from the target plate.

19. The method of claim 18, further comprising:
calculating a density of the wellbore fluid from the acoustic impedance of the wellbore fluid and the speed of sound in the wellbore fluid.

20. The method of claim 18, wherein the act of measuring an energy absorbed and retransmitted from the target plate comprises:
    measuring an energy absorbed and retransmitted from the target plate during a ring down window following an initial reflection of energy from the target plate.

21. The method of claim 18, wherein the act of enclosing a volume on a side of the target plate opposite the transducer, the volume having a lower acoustic impedance than the wellbore fluid comprises:
    filling the volume with a gas having a lower acoustic impedance than the wellbore fluid.

22. The method of claim 18, wherein the act of enclosing a volume on a side of the target plate opposite the transducer, the volume having a lower acoustic impedance than the wellbore fluid comprises:
    creating a vacuum in an enclosure attached to the target plate.

23. The method of claim 18, wherein the act of enclosing a volume on a side of the target plate opposite the transducer, the volume having a lower acoustic impedance than the wellbore fluid comprises:
    attaching an enclosure to the side of the target plate opposite the transducer by electron beam welding the enclosure to the target plate.

24. The method of claim 18, wherein the act of enclosing a volume on a side of the target plate opposite the transducer, the volume having a lower acoustic impedance than the wellbore fluid comprises:
    forming an integral target plate and enclosure walls unit;
    closing the enclosure walls with a cap; and
    disposing the cap and the integral target plate and enclosure walls unit such that the enclosure walls and cap form an enclosure on an opposite side of the target plate from the transducer.

* * * * *